United States Patent
Lindsay et al.

(10) Patent No.: US 10,240,622 B1
(45) Date of Patent: Mar. 26, 2019

(54) SWITCHABLE FLUIDIC DEVICE

(71) Applicant: Facebook Technologies, LLC, Menlo Park, CA (US)

(72) Inventors: Jack Lindsay, Seattle, WA (US); Sean Jason Keller, Kirkland, WA (US); David R. Perek, Bellevue, WA (US); Tristan Thomas Trutna, Seattle, WA (US); Nicholas Roy Corson, Mukilteo, WA (US); Raymond King, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/840,977

(22) Filed: Dec. 13, 2017

Related U.S. Application Data

(60) Provisional application No. 62/452,242, filed on Jan. 30, 2017.

(51) Int. Cl.
*F16K 31/12* (2006.01)
*F15C 3/04* (2006.01)
(Continued)

(52) U.S. Cl.
CPC ............. *F15C 3/04* (2013.01); *F16K 7/18* (2013.01); *F16K 31/12* (2013.01); *G06F 3/016* (2013.01); *G06F 3/014* (2013.01)

(58) Field of Classification Search
CPC ... F15C 3/04; F16K 31/12; F16K 7/18; G06F 3/016; G06F 3/014
(Continued)

(56) References Cited

U.S. PATENT DOCUMENTS

| 2,715,009 A | * | 8/1955 | Beekley | F16K 31/126 |
| | | | | 251/335.2 |
| 3,549,118 A | * | 12/1970 | Bluder | F16K 31/165 |
| | | | | 251/303 |

(Continued)

FOREIGN PATENT DOCUMENTS

| EP | 3351839 A2 | 7/2018 |
| KR | 10-2016-0098056 A | 8/2016 |

(Continued)

OTHER PUBLICATIONS

European Partial Search Report, European Application No. 18151564.4, dated Jul. 17, 2018, 17 pages.

(Continued)

*Primary Examiner* — John Bastianelli
(74) *Attorney, Agent, or Firm* — Fenwick & West LLP

(57) ABSTRACT

A fluidic device controls fluid flow in a channel conduit from a fluid entrance to a fluid exit. In some embodiments, the fluidic device comprises the channel conduit, a flexible element, a cross member, and a gate. The channel conduit is bounded by an inner surface that includes a protrusion. The flexible element is coupled to the inner surface of the channel conduit on a different side of the inner surface as the protrusion. The cross member has a first end that is coupled to a deformable surface that is part of the inner surface of the channel conduit and a second end that is coupled to the flexible element. The gate is configured to deform the deformable surface in accordance with a fluid pressure at the gate. An amount of deformation imparted by the gate controls a position of the flexible element via the cross member.

16 Claims, 3 Drawing Sheets

(51) Int. Cl.
*F16K 7/18* (2006.01)
*G06F 3/01* (2006.01)

(58) Field of Classification Search
USPC .......... 251/58, 61, 228, 298, 336–337, 902
See application file for complete search history.

(56) References Cited

U.S. PATENT DOCUMENTS

| | | | |
|---|---|---|---|
| 3,951,168 A * | 4/1976 | Roberts | F16K 7/18 137/625.28 |
| 5,078,363 A * | 1/1992 | Gregory | F16K 1/24 251/144 |
| 6,406,605 B1 | 6/2002 | Moles | |
| 6,474,623 B1 * | 11/2002 | Davies | F16K 31/1655 251/228 |
| 8,922,355 B2 | 12/2014 | Kusuura | |
| 2003/0196695 A1 | 10/2003 | O'Connor et al. | |
| 2006/0058740 A1 | 3/2006 | Cise et al. | |
| 2010/0180970 A1 | 7/2010 | Welle | |
| 2012/0039770 A1 | 2/2012 | Namkoong et al. | |
| 2014/0130920 A1 | 5/2014 | Fernandes et al. | |
| 2014/0134001 A1 | 5/2014 | Uchida et al. | |

FOREIGN PATENT DOCUMENTS

| | | |
|---|---|---|
| WO | WO 89/05417 A1 | 6/1989 |
| WO | WO 2016/205143 A1 | 12/2016 |

OTHER PUBLICATIONS

Eddington, D. et al., "Flow Control with Hydrogels," Advanced Drug Delivery Reviews, Feb. 10, 2004, pp. 199-210, vol. 56, No. 2.
Frank, P. et al., "Integrated Microfluidic Membrane Transistor Utilizing Chemical Information for On-Chip Flow Control," PLOS One, Aug. 29, 2016, e0161024, 17 pages, vol. 11, No. 8.
Yu, Q. et al., "Responsive Biomimetic Hydrogel Valve for Microfluidics," Applied Physics Letters, Apr. 23, 2001, pp. 2589-2591, vol. 78, No. 17.
PCT International Search Report and Written Opinion, PCT Application No. PCT/US2017/064683, dated Mar. 30, 2018, 19 pages.
Devaraju, N.S.G.K. et al., "Pressure Driven Digital Logic in PDMS Based Microfluidic Devices Fabricated by Multilayer Soft Lithography," Lab Chip, The Royal Society of Chemistry, 2012, pp. 4809-4815, vol. 12.
PCT International Search Report, PCT Application No. PCT/US2017/052048, dated May 23, 2018, 18 pages.
European Partial Search Report, European Application No. 18158349.3, dated Sep. 20, 2018, 17 pages.
Mohan, R. et al., "Design Considerations for Elastomeric Normally Closed Microfluidic Valves," Sensors and Actuators B: Chemical: International Journal Devoted to Research and Development of Physical and Chemical Transducers, Sep. 17, 2011, pp. 1216-1223, vol. 160, No. 11.
Perdigones, F.A. et al., "Correspondence Between Electronics and Fluids in MEMS: Designing Microfluidic Systems Using Electronics," IEEE Industrial Electronics Magazine, Dec. 1, 2014, pp. 6-17, vol. 8, No. 4.

* cited by examiner

SWITCHABLE FLUIDIC DEVICE

CROSS REFERENCE TO RELATED APPLICATIONS

This application claims benefit of U.S. Provisional Patent Application Ser. No. 62/452,242, filed Jan. 30, 2017, which is hereby incorporated by reference in its entirety.

BACKGROUND

The present disclosure generally relates to fluidic devices for head-mounted displays (HMD) and more specifically to using fluidic devices in virtual reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system.

SUMMARY

Embodiments of the disclosed invention include fluidic devices used in VR, augmented reality (AR) systems, and/or mixed reality (MR) systems. Fluidic devices are fluid handling devices that function analogous to electronic devices (e.g., an electrical transistor, an electrical diode, a resistor, a capacitor, etc.). For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g., a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state), the gate may restrict the fluid flow in the channel. In alternate embodiments, the flow in the channel is restricted until a threshold pressure (i.e., the high pressure state) in the gate is achieved.

In some embodiments, a fluidic device comprises a channel conduit, a flexible element, and a gate. The channel conduit includes a fluid entrance to the channel conduit and a fluid exit to channel conduit. The channel conduit is bounded by an inner surface that includes a protrusion that protrudes into the channel conduit. The flexible element is inside the channel conduit. The flexible element has at least one edge coupled to the inner surface of the channel conduit on a different side of the inner surface as the protrusion, and the flexible element has an adjustable position. The gate is configured to impart an amount of deformation to the deformable surface in accordance with an applied fluid pressure at the gate. The amount of deformation controls the adjustable position of the flexible element via a cross member that couples the flexible element to the deformable surface. In some embodiments, the fluidic device is part of a haptic device.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices, including at least one fluidic device described herein. In some embodiments, the fluidic devices are coupled together to form one or more composite fluidic devices.

Figure 1B:
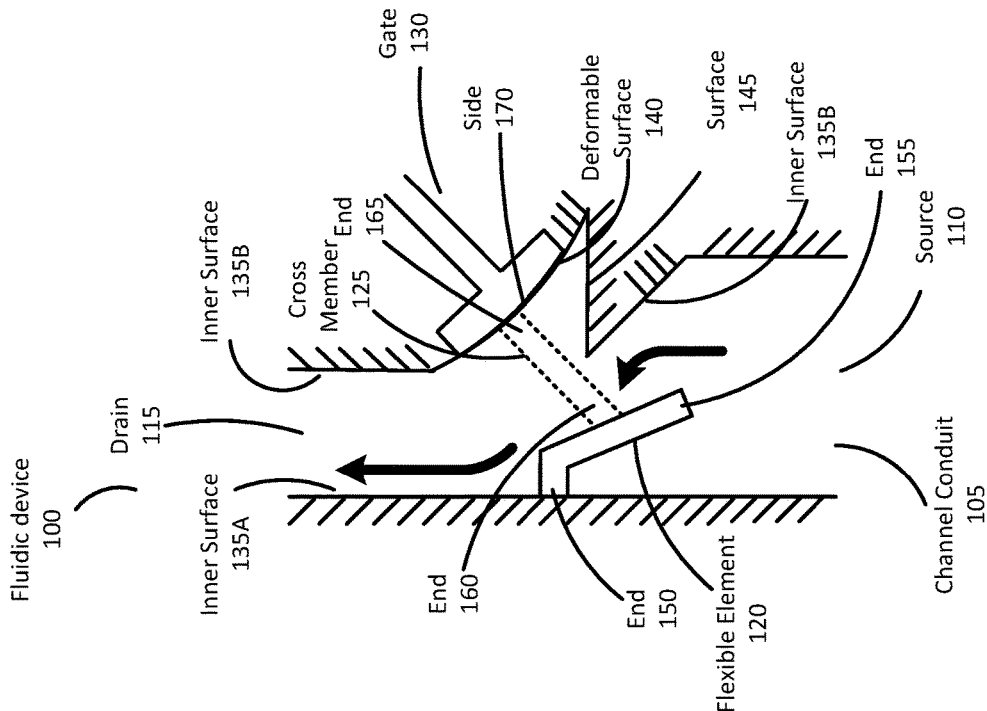
FIG. 1B is a cross section of the example fluidic device shown in FIG. 1A in a high pressure state, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments of the disclosed invention include fluidic devices used in Virtual Reality (VR), augmented reality (AR) systems, and/or mixed reality (MR) systems. In some embodiments, fluidic devices are devices made of soft materials that use millimeter or smaller channels filled with fluid to transmit information, and the fluidic devices typically implement logic and have control actuators for transmitting information. In one embodiment, the fluidic devices are fluid handling devices that function analogous to electronic devices (e.g., an electrical transistor, an electrical diode, etc.) in electrical systems. Additionally, fluidic devices are composable, meaning that fluidic devices may be coupled together to form a composite fluidic device. In some embodiments, groups of fluidic devices are coupled together to act as controllers for a haptic apparatuses on wearable devices (e.g., haptic gloves) for a VR system.

An embodiment of the fluidic device is discussed in detail below with regard to FIGS. 1A and 1B. In general, a state of the fluidic device (e.g., open, closed) controls fluid flow through the channel, and the state is based in part on a gate pressure value.

A flow rate indicates a volume of fluid per unit time flowing through the channel in a fluidic device. An example flow rate is 60 ml/min. The flow rate in a channel of a fluidic device may be affected by, e.g., a pressure of fluid from a corresponding fluid entrance.

An "open" state of a channel refers to a state when the fluid in the channel is flowing from one end to the other end at some open threshold flow rate. In contrast, a "closed" state of the channel refers to the state when the flow of fluid in the channel is less than some closed threshold flow rate, preventing the flow in the channel to flow from one end to the other end. In addition, a "transitionary" state occurs when the channel transitions from an open state to a closed state or from a closed state to an open state.

A "high pressure," a "transitionary" pressure, and a "low pressure" described here depend on the fluidic device structures and pressure of the fluid filling the fluidic device. In general, a "low pressure" is a pressure of the fluid that falls within a low pressure range, a "high pressure" is a pressure of the fluid that falls within a high pressure range, and a "transitionary" pressure is a pressure of the fluid that falls between the low pressure range and the high pressure range. Note, in some embodiments there is a high pressure range and a low pressure range, but not a transitionary range. Moreover, different components of a fluidic device may have different high pressure ranges, different transitionary pressure ranges, and different low pressure ranges. For example, a high pressure range of a gate may be significantly less than a high pressure range of a source.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices as described above. In some embodiments, the fluidic devices are coupled together to form one or more composite fluidic devices. A composite fluidic device is a device formed from a plurality of fluidic devices that are coupled together to form a fluidic circuit, and the fluidic devices are "composable," in that a plurality of fluidic devices may be coupled together to generate larger structures. More details about the "composite fluidic device" can be found in patent application with application number U.S. App. No. 62/449,323 filed on Jan. 23, 2017, which is hereby incorporated by reference in its entirety.

Figure 1A:
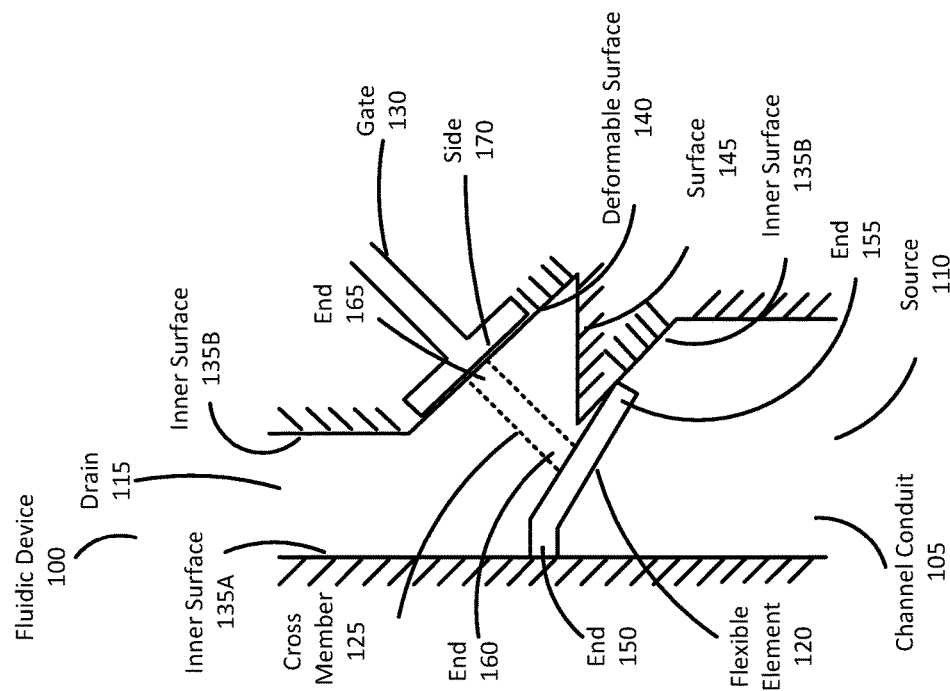
FIG. 1A is a cross section of an example fluidic device functioning as a fluid transistor in a low pressure state, in accordance with an embodiment.

Turning, now to a discussion of an example fluidic device that functions as an fluidic transistor, FIG. 1A is a cross section of an example fluidic device 100 functioning as a fluidic transistor in a low pressure state, in accordance with an embodiment. The fluidic device 100 includes a channel conduit 105 having a source 110 and a drain 115, a flexible element 120, a cross member 125, and a gate 130.

The channel conduit 105 is part of the fluidic device 100 and is bounded by an inner surface 135 (135A and 135B collectively referred as 135) and in the cross section illustrated in FIG. 1A, one side of the inner surface 135A and the other side of the inner surface 135B are shown. In particular, on the side of the inner surface 135B, there is a protrusion that includes a deformable surface 140 and a surface 145 that are coupled together. The deformable surface 140 can deform according to pressure applied on them. As shown in FIG. 1A, the deformable surface 140 is positioned adjacent to the gate 130, and is coupled to the cross member 125 inside the channel conduit 105, as more fully described below. The channel conduit 105 also includes the source 110 and the drain 115. The source 110 is also a fluid entrance of the channel conduit 105 and the drain 115 is a fluid exit of the channel conduit, and when the fluidic device 100 is in an open state, the fluid inside the channel conduit flows from the source (fluid entrance) to the drain (fluid exit).

The fluidic device 100 includes a flexible element 120 inside the channel conduit 105. The flexible element 120 works as a valve to make the channel conduit 105 open or closed. The flexible element 120 is coupled to the side of the inner surface 135A via a coupling end 150. The flexible element 120 is coupled to the cross member 125 such that movement of the cross member 125 causes movement of the flexible element 120. The flexible element 120 may be composed of rigid materials (e.g., metals), semi-rigid materials (plastics), deformable materials (e.g., elastic plastics, silicone rubber, other types of rubber etc.), some other material that allows the flexible element 120 to have an adjustable position, or some combination thereof. In one embodiment, when fluid pressure is greater at the source 110 than at the drain 115 and the gate 130 is in the low pressure state, the flexible element is positioned such that the end 155 is pushed against part of the side of the inner surface 135B, which closes the channel conduit and inhibits a flow rate within the channel conduit 105 to a threshold flow rate. This places the channel conduit 105 in a closed state.

The cross member 125 works as a medium to transfer force from the deformable surface 140 to the flexible element 120 to cause the end 155 to move. The cross member 125 is positioned inside the channel conduit 105. As one example, as shown in FIG. 1A, one end 160 of the cross member 125 is coupled to the flexible element 120, as described above, and the other end 165 of the cross member is coupled to the inner side of the deformable surface 140. The cross member 125 can be made of materials such as rigid plastic, metal, or stiff rubber.

The gate 130 is part of the fluidic device 100 that is positioned outside the channel conduit 105 and is adjacent to the deformable surface 140. In one embodiment, from the cross section of the fluidic device 100 shown in FIG. 1A, the gate 130 is T-shaped and has one side 170 that is adjacent to the deformable surface 140. In one embodiment, the gate 130 can be connected to the deformable surface 140 with the side 170 coupled to the deformable surface 140. The gate 130 has fluid (e.g., liquid or gas) inside it, and the fluid flow inside the gate applies pressure on the side 170 adjacent to the deformable surface 140. The gate 130 can be in a high pressure state or in a low pressure state. In FIG. 1A, the gate is in a low pressure state causing the fluidic device 100 to be in a low pressure state, and the channel conduit 105 is in a closed state accordingly.

A low pressure state of the fluidic device 100 indicates that the fluid pressure within the gate 130 is below a certain threshold value (e.g., 5 kPa). While in a low pressure state, the flow rate of fluid within the channel conduit 105 is below a threshold flow rate (e.g., 0.1 mL/s), and in some embodiments, the threshold flow rate may be zero. An example pressure threshold range is 0-100 kPa, and an example threshold flow rate ranges from 0-5 mL/s. In a low pressure state, the gate 130 imparts a small amount of force towards the deformable surface 140 such that the force is not large enough to make the cross member 125 further push the flexible element 120 to open the channel conduit 105. In the low pressure state, the fluidic device 100 remains a closed state and the fluid inside the channel conduit 105 is inhibited to a threshold flow rate.

FIG. 1B is a cross section of the example fluidic device 100 shown in FIG. 1A in a high pressure state, in accordance with an embodiment. In the embodiment of FIG. 1B, the fluidic device 100 is in a high pressure state. A high pressure state of the fluidic device 100 indicates that the fluid pressure applied on the gate 130 is above a certain threshold and the flow rate of the fluid is above a threshold flow rate. In a high pressure state, with fluid pressure applied on the gate 130, the gate 130 imparts an amount of deformation on the deformable surface 140, and the deformable surface 140 deforms accordingly. The amount of deformation of the deformable surface 140 forces the cross member 125 to push the flexible element 120 and forces the flexible element to change its position. Accordingly, as shown in FIG. 1B, the end 155 of the flexible element 120 is pushed off and apart from the side of the inner surface 135B, which opens the channel conduit 105 and allows the fluid inside the channel conduit 105 to flow from the source 110 to the drain 115. When the fluidic device 100 is in a high pressure state, the gate 130 is a high pressure state, and the channel conduit 105 is in an open state.

A transitionary state of the fluidic device 100 is a state between a high pressure state and a low pressure state. As one example, during a transitionary state of the fluidic device 100 from a high pressure state to a low pressure state, the fluid pressure applied on the gate 130 is gradually decreasing until the amount of deformation in the deformable surface 140 cannot push the cross member 125 to maintain the end of the flexible element 120 away from the side of the inner surface 135B such as to close the channel conduit 105. As another example, during a transitionary state of the fluidic device 100 from a low pressure state to a high pressure state, the fluid pressure applied on the gate is gradually increasing until the amount of deformation the deformable surface 140 has can push the cross member 125 to make the end of the flexible element 120 away from the side of the inner surface 135B such as to open the channel conduit 105.

Figure 2:
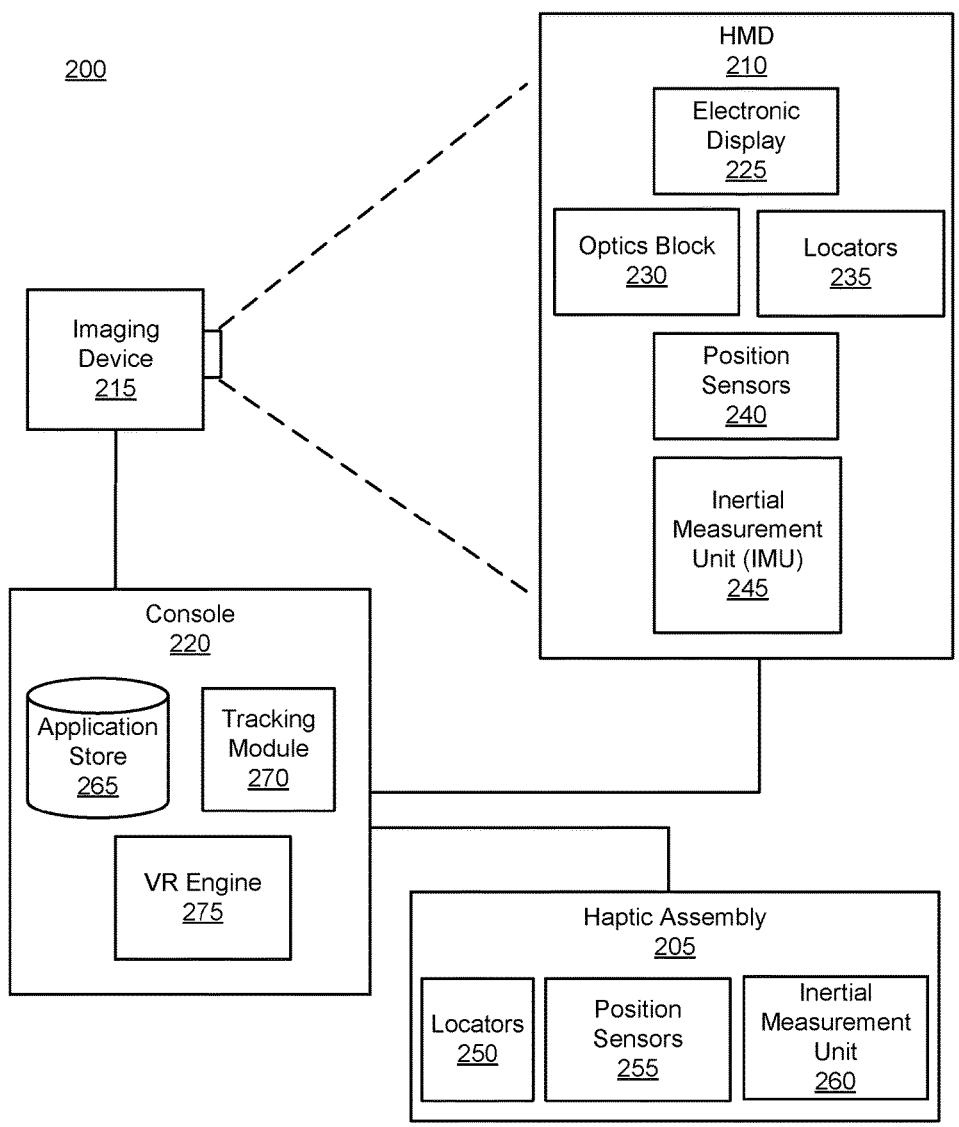
FIG. 2 is a block diagram of a system environment including a VR system, in accordance with an embodiment.

FIG. 2 is a block diagram of a system 200 including a haptic assembly 205, in accordance with one embodiment. The system 200 may operate in a VR environment, an augmented reality (AR) environment, a mixed reality (MR) environment, or some combination thereof. The system 200 comprises a head-mounted display (HMD) 210, an imaging device 215, and the haptic assembly 205 that are each coupled to a console 220. While FIG. 2 shows an example system 200 including one HMD 210, one imaging device 215, and one haptic assembly 205, in other embodiments any number of these components may be included in the system 200. For example, there may be multiple HMDs 210 each having an associated haptic assembly 205 and being monitored by one or more imaging devices 215, with each HMD 210, haptic assembly 205, and imaging device 215 communicating with the console 220. In alternative configurations, different and/or additional components may be included in the system 200. Additionally, in some embodiments the system 200 may be modified to include other system environments, such as an AR system environment.

The HMD 210 presents media to a user. Examples of media presented by the HMD 210 include one or more images, video, audio, or some combination thereof. In some embodiments, audio is presented via an external device (e.g., speakers and/or headphones) that receives audio information from the HMD 210, the console 220, or both, and presents audio data based on the audio information. The HMD 210 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 210 may also act as an augmented reality (AR) and/or mixed reality (MR) headset. In these embodiments, the HMD 210 augments views of a physical, real-world environment with computer-generated elements (e.g., images, video, sound, etc.).

The HMD 210 includes an electronic display 225, an optics block 230, one or more locators 235, one or more position sensors 240, and an inertial measurement unit (IMU) 245.

The optics block 230 magnifies received light from the electronic display 225, corrects optical errors associated with the image light, and the corrected image light is presented to a user of the HMD 210. An optical element may be an aperture, a Fresnel lens, a convex lens, a concave lens, a filter, or any other suitable optical element that affects the image light emitted from the electronic display 225. Moreover, the optics block 230 may include combinations of different optical elements. In some embodiments, one or more of the optical elements in the optics block 230 may have one or more coatings, such as anti-reflective coatings.

The locators 235 are objects located in specific positions on the HMD 210 relative to one another and relative to a specific reference point on the HMD 210. A locator 235 may be a light emitting diode (LED), a corner cube reflector, a reflective marker, a type of light source that contrasts with an environment in which the HMD 210 operates, or some combination thereof. In embodiments where the locators 235 are active (i.e., an LED or other type of light emitting device), the locators 235 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 235 are located beneath an outer surface of the HMD 210, which is transparent to the wavelengths of light emitted or reflected by the locators 235 or is thin enough to not substantially attenuate the wavelengths of light emitted or reflected by the locators 235. Additionally, in some embodiments, the outer surface or other portions of the HMD 210 are opaque in the visible band of wavelengths of light. Thus, the locators 235 may emit light in the IR band under an outer surface that is transparent in the IR band but opaque in the visible band.

The IMU 245 is an electronic device that generates fast calibration data based on measurement signals received from one or more of the position sensors 240. A position sensor 240 generates one or more measurement signals in response to motion of the HMD 210. Examples of position sensors 240 include: one or more accelerometers, one or more gyroscopes, one or more magnetometers, another suitable type of sensor that detects motion, a type of sensor used for error correction of the IMU 245, or some combination thereof. The position sensors 240 may be located external to the IMU 245, internal to the IMU 245, or some combination thereof.

Based on the one or more measurement signals from one or more position sensors 240, the IMU 245 generates fast calibration data indicating an estimated position of the HMD 210 relative to an initial position of the HMD 210. For example, the position sensors 240 include multiple accelerometers to measure translational motion (forward/back, up/down, left/right) and multiple gyroscopes to measure rotational motion (e.g., pitch, yaw, roll). In some embodiments, the IMU 245 rapidly samples the measurement signals and calculates the estimated position of the HMD 210 from the sampled data. For example, the IMU 245 integrates the measurement signals received from the accelerometers over time to estimate a velocity vector and integrates the velocity vector over time to determine an estimated position of a reference point on the HMD 210. Alternatively, the IMU 245 provides the sampled measurement signals to the HMD 210, which determines the fast calibration data. The reference point is a point that may be used to describe the position of the HMD 210. While the reference point may generally be defined as a point in space; however, in practice the reference point is defined as a point within the HMD 210 (e.g., a center of the IMU 245).

The IMU 245 receives one or more calibration parameters from the console 220. As further discussed below, the one or more calibration parameters are used to maintain tracking of the HMD 210. Based on a received calibration parameter, the IMU 245 may adjust one or more IMU parameters (e.g., sample rate). In some embodiments, certain calibration parameters cause the IMU 245 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 215 generates slow calibration data in accordance with calibration parameters received from the console 220. Slow calibration data includes one or more images showing observed positions of the locators 235 that are detectable by the imaging device 215. The imaging device 215 may include one or more cameras, one or more video cameras, any other device capable of capturing images including one or more of the locators 235, or some combination thereof. Additionally, the imaging device 215 may include one or more filters (e.g., used to increase signal to noise ratio). The imaging device 215 is designed to detect light emitted or reflected from locators 235 in a field of view of the imaging device 215. In embodiments where the locators 235 include passive elements (e.g., a retroreflector), the imaging device 215 may include a light source that illuminates some or all of the locators 235, which retro-reflect the light towards the light source in the imaging device 215. Slow calibration data is communicated from the imaging device 215 to the console 220, and the imaging device 215 receives one or more calibration parameters from the console 220 to adjust one or more imaging parameters (e.g., focal length, focus, frame rate, ISO, sensor temperature, shutter speed, aperture, etc.).

The haptic assembly 205 is a device that allows a user to send action requests to the console 220. An action request is a request to perform a particular action. For example, an action request may be to start or end an application or to perform a particular action within the application. The haptic assembly 205 also provides haptic feedback including a perception of contacting a virtual object. In one embodiment, the haptic assembly 205 includes a plurality of composable fluidic devices that form one or more composite fluidic devices. The composite fluidic devices may be used to, e.g., address actuators included in the haptic assembly 205 according to the haptic feedback signal from the console 220. In one embodiment, as more fully described below in FIG. 3, the haptic assembly 205 is a haptic glove through which the console 220 enables a user to interact with a virtual object.

In FIG. 2, the haptic assembly 205 further includes locators 250, one or more position sensors 255, and an inertial measurement unit (IMU) 260. In some embodiments, the locators 250, one or more position sensors 255, an inertial measurement unit (IMU) 260 are installed to determine a physical position or movement of the haptic assembly 205. In addition, the haptic assembly 205 receives, from the console 220, a haptic feedback signal corresponding to haptic feedback to the user. The haptic assembly 205 provides to the user with the haptic feedback of touching a virtual object in a virtual space, according to the haptic feedback signal. Specifically, the haptic assembly 205 prevents or enables a physical movement of a portion of a user in contact with the virtual object in the virtual space. For example, if a user's finger is in contact with a virtual object (e.g., a virtual wall) in a virtual space, the haptic assembly 205 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 205 to be actuated, and an amount of actuation of the position or the portion of the haptic assembly 205 for providing haptic feedback. In this embodiment, the amount of actuation is determined by, e.g., the console 220, according to a virtual position of the haptic assembly 205 corresponding to a physical position of the haptic assembly 205 and a virtual position of a virtual object in a virtual space. The haptic assembly 205 provides tactile perception of a user touching the virtual object according to the amount of actuation indicated by the haptic feedback signal.

The locators 250 are objects located in specific positions on the haptic assembly 205 relative to one another and relative to a specific reference point of the haptic assembly 205 on the haptic assembly 205. A locator 250 is substantially similar to a locator 235 except that the locator 250 is part of the haptic assembly 205. Additionally, in some embodiments, the outer surface or other portions of the haptic assembly 205 are opaque in the visible band of wavelengths of light. Thus, the locators 250 may emit light in the IR band under an outer surface that is transparent in the IR band but opaque in the visible band.

A position sensor 255 generates one or more measurement signals in response to motion of the haptic assembly 205. The position sensors 255 are substantially similar to the positions sensors 225, except that the position sensors 255 are part of the haptic assembly 205. The position sensors 255 may be located external to the IMU 260, internal to the IMU 260, or some combination thereof.

Based on the one or more measurement signals from one or more position sensors 255, the IMU 260 generates fast calibration data of the haptic assembly 340 indicating an estimated position of the haptic assembly 205 relative to an initial position of the haptic assembly 205. For example, the position sensors 255 include multiple accelerometers to measure translational motion (forward/back, up/down, left/right) and multiple gyroscopes to measure rotational motion (e.g., pitch, yaw, roll) of the haptic assembly 205. In some embodiments, the IMU 260 rapidly samples the measurement signals and calculates the estimated position of the haptic assembly 205 from the sampled data. For example, the IMU 260 integrates the measurement signals received from the accelerometers over time to estimate a velocity vector and integrates the velocity vector over time to determine an estimated position of a reference point of the haptic assembly 205. Alternatively, the IMU 260 provides the sampled measurement signals to the console 220, which determines the fast calibration data of the haptic assembly 205. The reference point of the haptic assembly 205 is a point that may be used to describe the position of the haptic assembly 205. While the reference point of the haptic assembly 205 may generally be defined as a point in space; however, in practice the reference point of the haptic assembly 205 is defined as a point within the haptic assembly 205 (e.g., a center of the IMU 260).

The IMU 260 receives one or more calibration parameters of the haptic assembly 205 from the console 220. As further discussed below, the one or more calibration parameters of the haptic assembly 205 are used to maintain tracking of the haptic assembly 205. Based on a received calibration parameter of the haptic assembly 205, the IMU 260 may adjust one or more IMU parameters (e.g., sample rate). In some embodiments, certain calibration parameters of the haptic assembly 205 cause the IMU 260 to update an initial position of the reference point of the haptic assembly 205 so it corresponds to a next calibrated position of the reference point of the haptic assembly 205. Updating the initial position of the reference point of the haptic assembly 205 as the next calibrated position of the reference point of the haptic assembly 205 helps reduce accumulated error associated with the determined estimated position.

The console 220 provides media to the HMD 210 for presentation to the user in accordance with information received from one or more of: the imaging device 215, the VR headset 210, and the haptic assembly 205. In the example shown in FIG. 3, the console 220 includes an application store 265, a tracking module 270, and a virtual reality (VR) engine 275. Some embodiments of the console 220 have different modules than those described in conjunction with FIG. 2. Similarly, the functions further described below may be distributed among components of the console 220 in a different manner than is described here.

The application store 265 stores one or more applications for execution by the console 220. An application is a group of instructions, that when executed by a processor, generates content for presentation to the user. Content generated by an application may be in response to inputs received from the user via movement of the HMD 210 or the haptic assembly 205. Examples of applications include: gaming applications, conferencing applications, video playback application, or other suitable applications.

The tracking module 270 calibrates the VR system 200 using one or more calibration parameters and may adjust one or more calibration parameters to reduce error in determination of the position of the HMD 210. For example, the tracking module 270 adjusts the focus of the imaging device 215 to obtain a more accurate position for observed locators on the HMD 210. Moreover, calibration performed by the tracking module 270 also accounts for information received from the IMU 245. Additionally, if tracking of the HMD 210 is lost (e.g., the imaging device 215 loses line of sight of at least a threshold number of the locators 235), the tracking module 270 re-calibrates some or all of the system 200.

The tracking module 270 tracks movements of the HMD 210 using slow calibration information from the imaging device 215. The tracking module 270 determines positions of a reference point of the HMD 210 using observed locators from the slow calibration information and a model of the HMD 210. The tracking module 270 also determines positions of a reference point of the HMD 210 using position information from the fast calibration information. Additionally, in some embodiments, the tracking module 270 may use portions of the fast calibration information, the slow calibration information, or some combination thereof, to predict a future location of the HMD 210. The tracking module 270 provides the estimated or predicted future position of the HMD 210 to the VR engine 275.

The VR engine 275 executes applications within the system 200 and receives position information, acceleration information, velocity information, predicted future positions, or some combination thereof of the HMD 210 from the tracking module 270. Based on the received information, the VR engine 275 determines content to provide to the HMD 210 for presentation to the user. For example, if the received information indicates that the user has looked to the left, the VR engine 275 generates content for the HMD 210 that mirrors the user's movement in a virtual environment. Additionally, the VR engine 275 performs an action within an application executing on the console 220 in response to an action request received from the haptic assembly 205 and provides feedback to the user that the action was performed. The provided feedback may be visual or audible feedback via the HMD 210 or haptic feedback via the haptic assembly 205.

Figure 3:
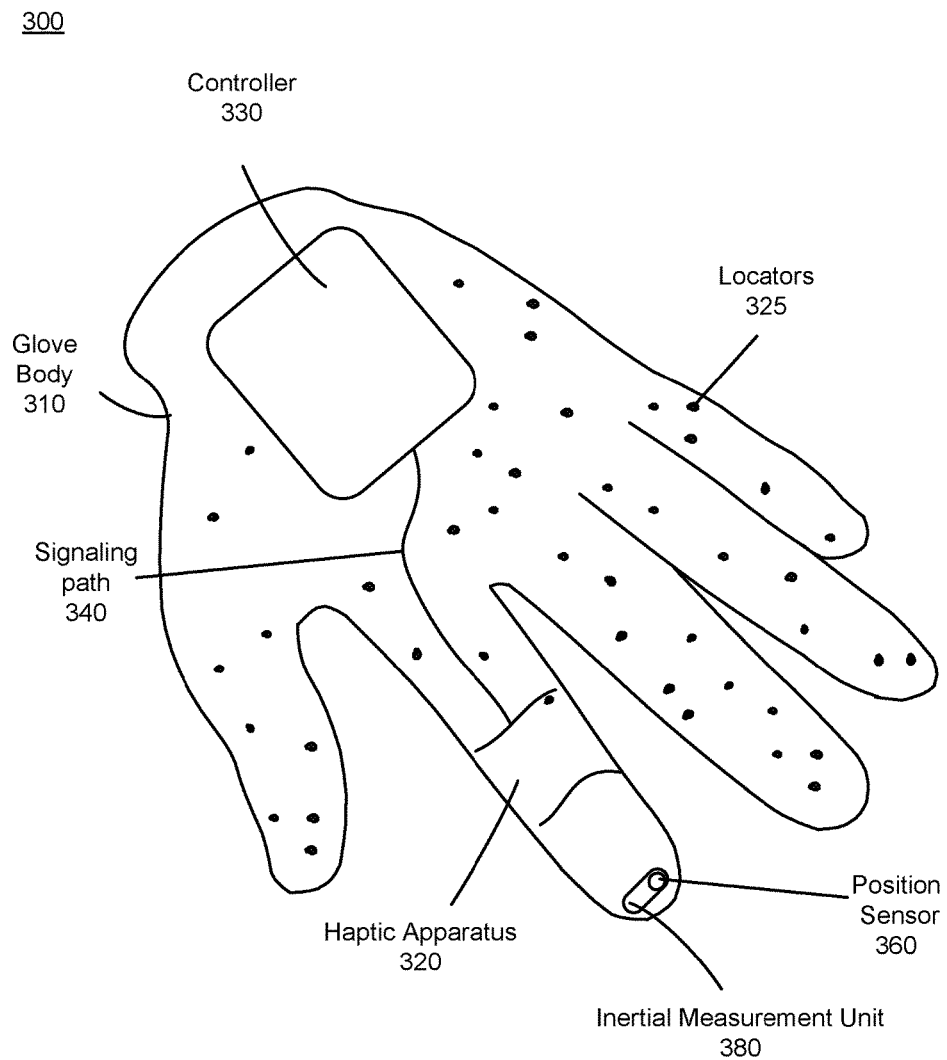
FIG. 3 is an example haptic glove for interacting with virtual objects, in accordance with an embodiment.

FIG. 3 is an example haptic glove 300 for interacting with virtual objects, in accordance with an embodiment. The haptic glove 300 shown in FIG. 3 includes a glove body 310, a haptic apparatus 320, a controller 330, a signaling path 340, one or more locators 325, a position sensor 360 and an IMU 380. Only signaling path 340, one haptic apparatus 320, one position sensor 360 and one IMU 380 are shown in FIG. 3 to simplify the description. In alternative embodiments not shown, the haptic glove 300 can include multiple tubes, position sensors and haptic apparatus that are connected to the controller 330, for example, for each finger of the haptic glove 300, a set of haptic apparatus, position sensors and IMUs may be connected to the controller. Likewise, the functions performed by the various entities of the haptic glove 300 may differ in different embodiments. Additionally, the various entities of the haptic glove 300 may be positioned in different places on the glove body 310. As one example, additional haptic apparatuses 320 and the position sensors 360 are located at different parts of the glove body 310. As another example, the haptic apparatuses 320 are coupled to or wrap the entire fingers of the glove body 310. As another example, the controller 330 is coupled to a different portion of the glove body 310 corresponding to, for example a wrist or a palm.

The glove body 310 is an apparatus covering a hand, for example, a garment that is coupled to the position sensor 360, the haptic apparatus 320, the controller 330, and the signaling 340. In one embodiment, the position sensor 360 is coupled to a corresponding finger of the glove body 310 (e.g., a portion corresponding to a fingertip of the glove body); the haptic apparatus 320 is coupled to a corresponding finger portion (e.g., a portion corresponding to a joint between two phalanges) of the glove body 310; and the controller 330 is coupled to a portion of the glove body 310 corresponding to a back of a hand (i.e., dorsal side). The signaling path 340 is coupled between the controller 330 and the haptic apparatus 320. In one embodiment, one or more of these components are placed beneath an outer surface of the glove body 310, thus are not visible from the outside. Additionally or alternatively, some of these components are placed on an outer surface of the glove body 310, and are visually detectable.

In one embodiment, the haptic glove 300 may be the haptic assembly 340 shown in FIG. 2 and the locators 325, the position sensor 360 and the IMU 380 of the haptic glove 300 may be the corresponding locators 250, position sensors 255 and IMUs 260 of the haptic assembly 205 shown in FIG. 2. A user's hand movement can be detected and tracked according to fast calibration data from the IMU 380 and/or slow calibration of the locators 325 from the imaging device 335. Moreover, haptic feedback including a perception of a user contacting a virtual object can be provided to the user by the controller 330, signaling 340, and haptic apparatus 320.

The haptic apparatus 320 provides haptic feedback including a perception of a user touching a virtual object. In one embodiment, the haptic apparatus 320 is actuated according to instructions received from the controller 330. In one embodiment, the haptic apparatus 320 is coupled to a portion corresponding to a joint between two phalanges of the glove body 310. In another embodiment, the haptic apparatus 320 covers the entire glove body 310 or are placed on other parts (e.g., an area corresponding to a joint between two different fingers) of the glove body 310. The haptic apparatus 320 may be, for example, a plurality of actuators.

The controller 330 is a device that provides instructions for the haptic apparatus 320 to perform specific functions. The controller 330 may receive instructions or haptic feedback from the VR console 220 and actuates the haptic apparatus 320 accordingly. The controller 330 includes a plurality of fluidic devices that generate instructions for one or more haptic apparatuses (e.g., actuators). As discussed in detail above, with regard to FIGS. 1A-1B fluidic devices are composable and may be coupled together to form composite fluidic devices, like, e.g., a decoder. Decoders, for example, can help reduce a number of logical connections within the controller 330 and/or connections to the haptic apparatus 320. Accordingly, the controller 330 may be composed of a plurality of fluidic devices, including the example device described above with regard to FIGS. 1A-1B. Similar to the controllers 330, the signaling path 340 may be a tube or a fluidic device formed from the example fluidic device with reference to FIGS. 1A-1B. In one embodiment, the example fluidic devices open or close fluidic inputs to actuators, performing logical operations on the instructions passing through the controller 330.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A fluidic device comprising:
   a channel conduit including a fluid entrance to the channel conduit and a fluid exit from the channel conduit, the channel conduit bounded by an inner surface that includes a protrusion that protrudes into the channel conduit;
   a flexible element inside the channel conduit, the flexible element having at least one edge coupled to the inner surface of the channel conduit on a different side of the inner surface as the protrusion, the flexible element having an adjustable position; and
   a deformable surface that is part of the inner surface of the channel conduit;
   a gate configured to impart an amount of deformation to the deformable surface in accordance with an applied fluid pressure at the gate, and the amount of deformation controls the adjustable position of the flexible element via a cross member that couples the flexible element to the deformable surface.

2. The fluidic device of claim 1, wherein a low pressure state of the gate corresponds to a first flow rate of the fluid in the channel conduit, and a high pressure state of the gate corresponds to a second flow rate of the fluid in the channel conduit, and the second flow rate is greater than the first flow rate.

3. The fluidic device of claim 2, wherein at the low pressure state of the gate, an end of the flexible element is configured to be in contact with the protrusion to inhibit a flow rate within the channel conduit to the first flow rate.

4. The fluidic device of claim 2, wherein at the high pressure state of the gate, an end of the flexible element is configured to be apart from the protrusion to allow a fluid to flow within the channel conduit at the second flow rate.

5. The fluidic device of claim 1, wherein the fluidic device is a component of a wearable device.

6. The fluidic device of claim 1, wherein the fluidic device is a component of a haptic glove.

7. A fluidic device comprising:
a channel conduit including a fluid entrance to the channel conduit and a fluid exit from the channel conduit, the channel conduit bounded by an inner surface that includes a protrusion that protrudes into the channel conduit;
a flexible element inside the channel conduit, the flexible element having at least one edge coupled to the inner surface of the channel conduit on a different side of the inner surface as the protrusion, the flexible element having an adjustable position;
a cross member with a first end and a second end, the first end coupled to a deformable surface and the deformable surface is part of the inner surface of the channel conduit and the second end is coupled to the flexible element; and
a gate configured to impart an amount of deformation to the deformable surface in accordance with an applied fluid pressure at the gate, and the amount of deformation controls the adjustable position of the flexible element via the cross member.

8. The fluidic device of claim 7, wherein a low pressure state of the gate corresponds to a first flow rate of the fluid in the channel conduit, and a high pressure state of the gate corresponds to a second flow rate of the fluid in the channel conduit, and the second flow rate is greater than the first flow rate.

9. The fluidic device of claim 8, wherein at the low pressure state of the gate, an end of the flexible element is configured to be in contact with the protrusion to inhibit a flow rate within the channel conduit to the first flow rate.

10. The fluidic device of claim 8, wherein at the high pressure state of the gate, an end of the flexible element is configured to be apart from the protrusion to allow a fluid to flow within the channel conduit at the second flow rate.

11. A haptic device comprising:
at least one fluidic device, the fluidic device comprising:
a channel conduit including a fluid entrance to the channel conduit and a fluid exit from the channel conduit, the channel conduit bounded by an inner surface that includes a protrusion that protrudes into the channel conduit,
a flexible element inside the channel conduit, the flexible element having at least one edge coupled to the inner surface of the channel conduit on a different side of the inner surface as the protrusion, the flexible element having an adjustable position,
a cross member with a first end and a second end, the first end coupled to a deformable surface and the deformable surface is part of the inner surface of the channel conduit and the second end is coupled to the flexible element, and
a gate configured to impart an amount of deformation to the deformable surface in accordance with an applied fluid pressure at the gate, and the amount of deformation controls the adjustable position of the flexible element via the cross member.

12. The haptic device of claim 11, wherein a low pressure state of the gate corresponds to a first flow rate of the fluid in the channel conduit, and a high pressure state of the gate corresponds to a second flow rate of the fluid in the channel conduit, and the second flow rate is greater than the first flow rate.

13. The haptic device of claim 12, wherein at the low pressure state of the gate, an end of the flexible element is configured to be in contact with the protrusion to inhibit a flow rate within the channel conduit to the first flow rate.

14. The haptic device of claim 12, wherein at the high pressure state of the gate, an end of the flexible element is configured to be apart from the protrusion to allow a fluid to flow within the channel conduit at the second flow rate.

15. The haptic device of claim 11, wherein the haptic device is a wearable device.

16. The haptic device of claim 11, wherein the haptic device is a haptic glove.

* * * * *